US006549824B1

(12) United States Patent
Satou et al.

(10) Patent No.: US 6,549,824 B1
(45) Date of Patent: Apr. 15, 2003

(54) NUMERICALLY CONTROLLING DEVICE FOR ELECTRICAL DISCHARGE MACHINE

(75) Inventors: Seiji Satou, Tokyo (JP); Toru Inoue, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 320 days.

(21) Appl. No.: 09/709,287

(22) Filed: Nov. 13, 2000

Related U.S. Application Data

(63) Continuation of application No. PCT/JP98/02100, filed on May 12, 1998.

(51) Int. Cl.⁷ .............................................. G06F 19/00
(52) U.S. Cl. ................................. 700/162; 700/180
(58) Field of Search ............................ 700/17, 18, 23, 700/26, 27, 65, 83, 159–162, 174, 175, 180; 345/700, 714, 771, 772

(56) References Cited

U.S. PATENT DOCUMENTS

| | | | |
|---|---|---|---|
| 4,490,781 A | * 12/1984 | Kishi et al. | 700/86 |
| 4,591,989 A | * 5/1986 | Tanaka | 700/176 |
| 4,648,028 A | * 3/1987 | DeKlotz et al. | 700/83 |
| 4,723,207 A | * 2/1988 | Isobe et al. | 700/180 |
| 5,175,407 A | * 12/1992 | Seki et al. | 219/69.12 |
| 5,177,689 A | * 1/1993 | Kinasi et al. | 700/184 |
| 6,122,664 A | * 9/2000 | Boukobza et al. | 709/224 |
| 2001/0012021 A1 | * 8/2001 | Nishiyama et al. | 345/763 |

FOREIGN PATENT DOCUMENTS

| | | | |
|---|---|---|---|
| JP | 62-212808 | 9/1987 | ......... G05B/19/405 |
| JP | 63-025706 | * 2/1988 | |
| JP | 2-196375 | 8/1990 | ............ G06F/15/40 |
| JP | 3-167607 | 7/1991 | ......... G05B/19/405 |
| JP | 4-251305 | 9/1992 | ......... G05B/19/405 |
| JP | 6-8115 | 1/1994 | ............ B23Q/41/08 |
| JP | 06-110536 | * 4/1994 | |
| JP | 7-116945 | 5/1995 | ............ B23Q/41/00 |
| JP | 7-204942 | 8/1995 | ............. B23H/7/20 |
| JP | 07-276144 | * 10/1995 | |
| JP | 8-50505 | 2/1996 | ....... G05B/19/4097 |
| JP | 8-129411 | 5/1996 | ....... G05B/19/4061 |
| JP | 9-146620 | 6/1997 | ....... G05B/19/4063 |
| JP | 9-212220 | 8/1997 | ....... G05B/19/4062 |
| WO | WO-96-07958 | * 3/1996 | |

\* cited by examiner

*Primary Examiner*—Maria N. Von Buhr
(74) *Attorney, Agent, or Firm*—Sughrue Mion, PLLC

(57) ABSTRACT

Pieces of information such as work program information, work profile and work condition, which are necessary for an operator to grasp a state of a machine tool, a change in the work voltage necessary for an operator to grasp a state of working a workpiece, pieces of work monitoring information such as a change in the work speed, and measured data of the workpiece are display on a list by a display device of a numerically controlling device for each session of work.

8 Claims, 5 Drawing Sheets

IMAGE PLANE OF DISPLAY DEVICE

FIG. 2

NUMERICALLY CONTROLLING DEVICE INSIDE INFORMATION

- ■ WORK MONITORING INFORMATION
  - · CHANGE IN VOLTAGE, CHANGE IN CURRENT, CHANGE IN SPEED
  - · MOVEMENT DISTANCE AND OTHERS
- ■ RESULT OF WORK
  - · WORK TIME
  - · WORK SPEED
- ■ INFORMATION OF ARRANGEMENT
  - · NC DATA, WORK PROFILE
  - · E PACK CONDITION AND OTHERS

MEASURED DATA OF PRODUCT

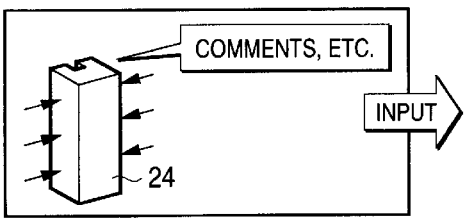

COMMENTS, ETC.

INPUT

INPUT

21

DATABASE

STRUCTURE OF INSIDE OF DATA BASE 21

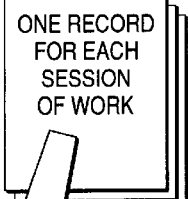

ONE RECORD FOR EACH SESSION OF WORK

- ■ COMPOSITION OF FORM (RECORD)
  - ◆ ITEM OF ARRANGEMENT SETTING
  - ◆ WORK CONDITION DATA
  - ◆ RESULT OF WORK
    - · WORK TIME
    - · WORK SPEED
  - ◆ RESULT OF WORK
    - · INPUT OF MEASURED DATA
  - ◆ WORK MONITORING INFORMATION
  - ◆ COMMENTS

- ■ EXAMPLES OF FIELD ITEM
  - ◆ ITEM OF ARRANGEMENT SETTING
    - · WIRE ELECTRODE (TYPE, DIAMETER), WORKPIECE (TYPE, WALL THICKNESS)
    - · TAPER ITEM, MACHINE NUMBER
    - · WORK FLUID (FLOW RATE, FLUID PRESSURE, TEMPERATURE), NOZZLE INTERVAL SETTING
    - · DATE, TIME, AIR TEMPERATURE, WORK PROGRAM INFORMATION
  - ◆ WORK CONDITION INFORMATION
    - · WORK FREQUENCY (1ST, 2ND, 3RD, DISPLAYED ON SPREAD SHEET)
    - · ELECTRICAL CONDITION NO., NOTCH SETTING INFORMATION, QUANTITY OF OFFSET, QUANTITY OF DRAW
    - · SETTING OF AVERAGE VOLTAGE, SETTING OF WORK SPEED
  - ◆ RESULT OF WORK (INSIDE DATA OF NUMERICALLY CONTROLLING DEVICE)
    - · WORK TIME (1ST, 2ND, 3RD, TOTAL WORK TIME)
    - · WORK SPEED (1ST, 2ND, 3RD, AVERAGE WORK SPEED)
  - ◆ RESULT OF WORK (PORTION OF INPUT OF MEASURED DATA)
    - · SURFACE ROUGHNESS, STRAIGHTNESS ACCURACY, MEASURED DATA OF DIMENSIONAL ACCURACY
  - ◆ WORK MONITORING INFORMATION
    - · WORK PROGRAM PROFILE
    - · WORK SPEED (1ST, 2ND, 3RD)
    - · WORK VOLTAGE (1ST, 2ND, 3RD)
  - ◆ COMMENT INPUT SECTION
    - · POINT OF WORK, JUDGMENT OF QUALITY, POINTS THAT DEMAND SPECIAL ATTENTION
    - · WORK DIARY AND OTHERS, NAME OF OPERATOR

FIG. 3

EXAMPLE OF LIST

■ PORTION IN WHICH INFORMATION OF ARRANGEMENT IS DISPLAYED

| | | |
|---|---|---|
| WIRE ELECTRODE ○○○ | WORK FLUID ○○○ | DATE ○○○ |
| WORKPIECE △△△ | TAPER ITEM △△△ | TIME △△△ |
| PROGRAM □□□ | STATE OF NOZZLE □□□ | AIR TEMPERATURE □□□ |

■ PORTION IN WHICH INFORMATION OF WORK IS DISPLAYED

| E PACK | 1ST | 2ND | 3RD | 4TH |
|---|---|---|---|---|
| | | | | |

■ WORK TIME, PORTION IN WHICH SPEED IS DISPLAYED

WORK TIME DISPLAY SECTION

1ST     WORK TIME
2ND    WORK TIME
3RD    WORK TIME
4TH    WORK TIME
TOTAL WORK TIME

WORK SPEED DISPLAY SECTION

1ST     WORK SPEED
2ND    WORK SPEED
3RD    WORK SPEED
4TH    WORK SPEED
TOTAL WORK SPEED

■ PORTION IN WHICH WORK MONITORING INFORMATION IS DISPLAYED

DISPLAY OF WORK VOLTAGE AND WORK SPEED

1ST  VG  FC
2ND  VG  FC
3RD  VG  FC
4TH  VG  FC

1ST  VG  FC         1ST  VG  FC
2ND  VG  FC         2ND  VG  FC
3RD  VG  FC         3RD  VG  FC
4TH  VG  FC         4TH  VG  FC

DISPLAY OF PROFILE OF WORK PROGRAM

■ PORTION IN WHICH MEASURED DATA IS INPUTTED

INPUT OF RESULT OF MEASUREMENT OF DIMENSIONAL ACCURACY

INPUT OF RESULT OF MEASUREMENT OF SURFACE ROUGHNESS

COMMENT INPUT SECTION

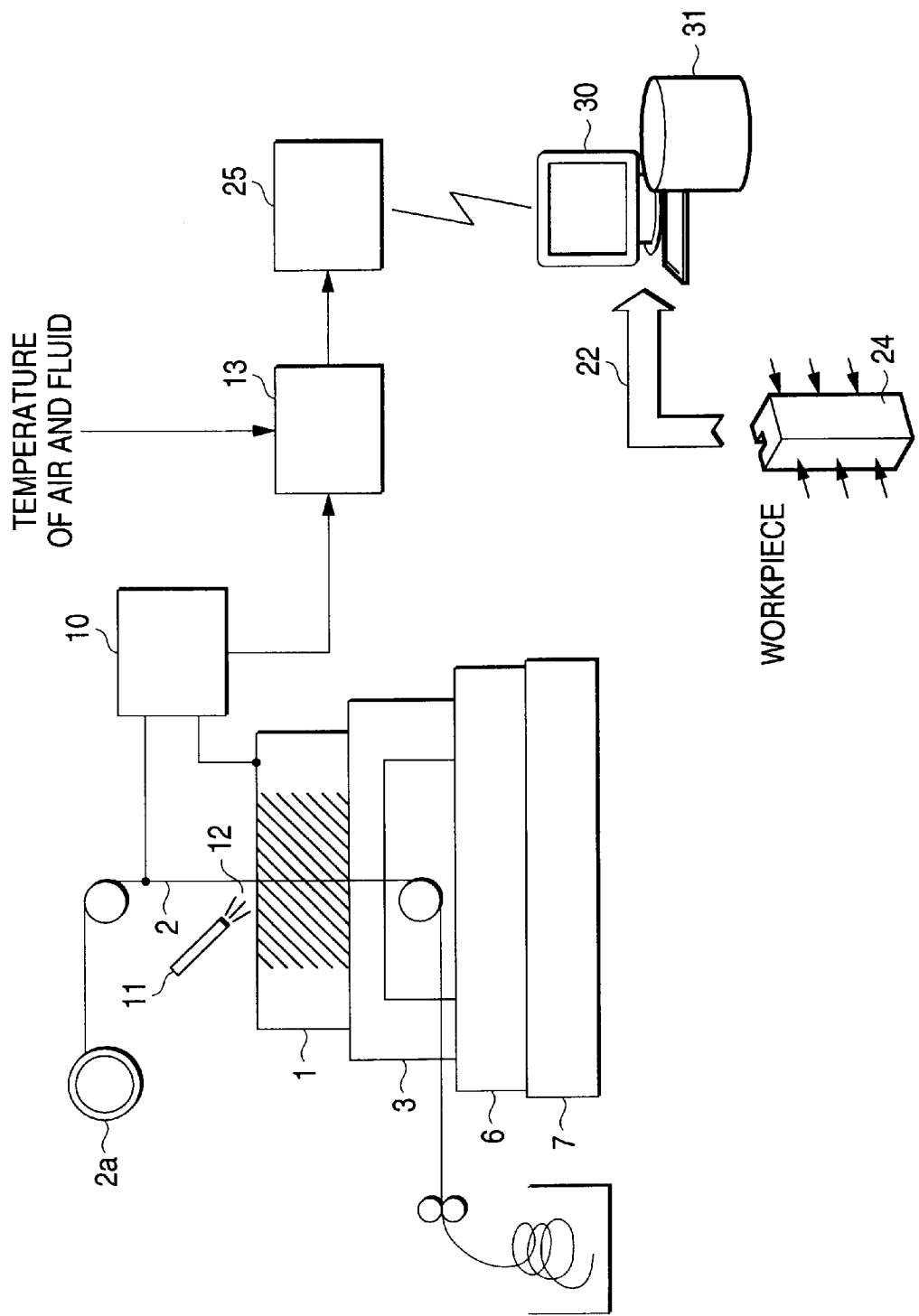

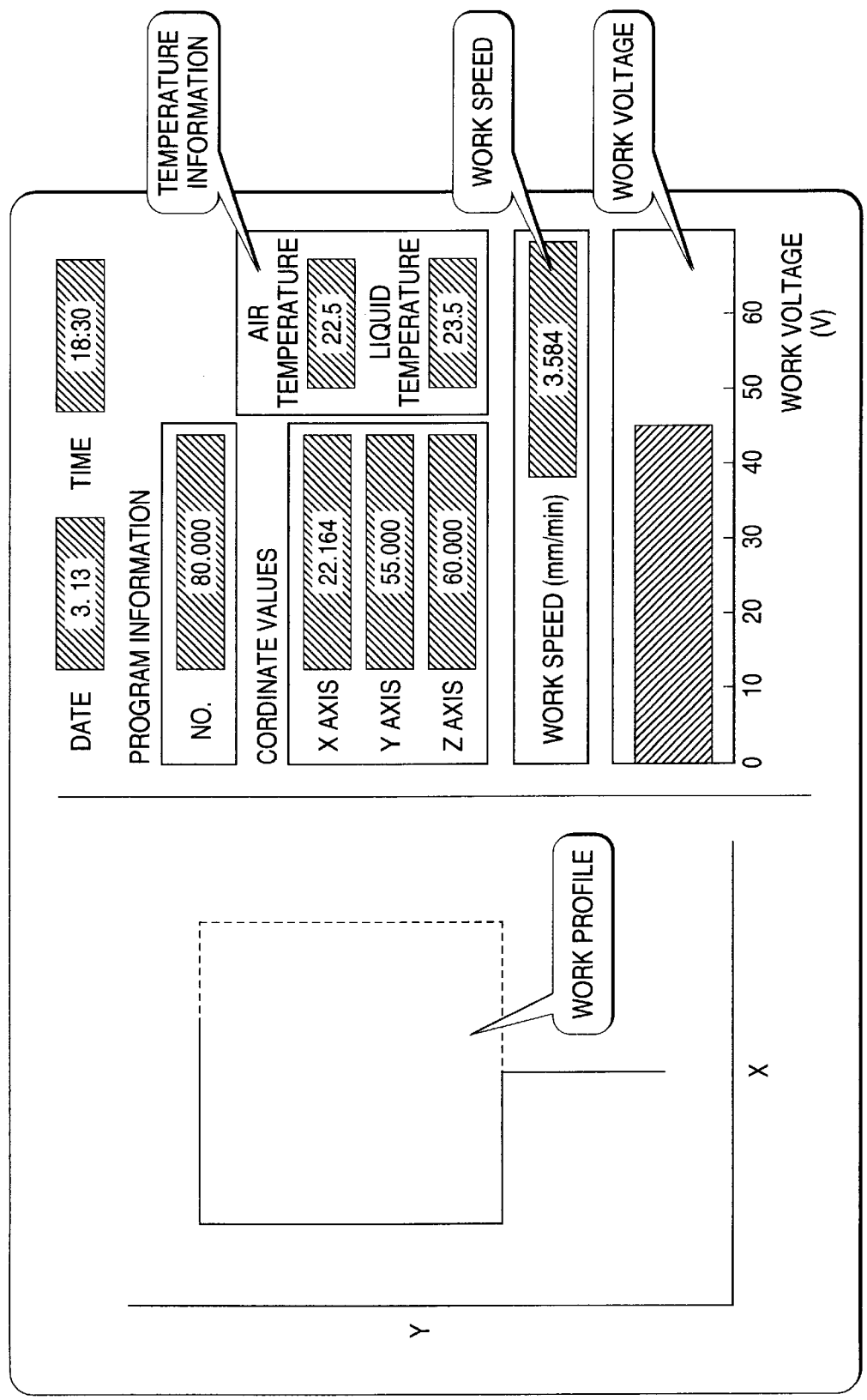

NUMERICALLY CONTROLLING DEVICE FOR ELECTRICAL DISCHARGE MACHINE

This is a continuation of application Ser. No. PCT/JP98/02100 filed May 12, 1998.

BACKGROUND OF THE INVENTION

1. Field of the Invention

The present invention relates to improvements in a numerically controlling device for an electrical discharge machine. More particularly, the present invention relates to improvements in a numerically controlling device for an electrical discharge machine capable of effectively conducting the confirmation of a state of working a workpiece by an operator and also effectively conducting the judgment of a working condition.

2. Description of the Related Art

A wire electrical discharge machine is taken up as an example of the electrical discharge machine. The wire electrical discharge machine will be explained as follows. Wire electrical discharge is conducted in such a manner that a wire electrode is arranged being opposed to a workpiece leaving a predetermined interval and a voltage is impressed between the workpiece and the wire electrode under the condition that a working fluid is interposed between the workpiece and the wire electrode. At this time, when the wire electrode and the workpiece are made to come close to each other and a gap formed between the wire electrode and the workpiece becomes a predetermined value, an electrical discharge is caused between the wire electrode and the workpiece. The work piece is worked by the energy produced in this electrical discharge.

In the above wire electrical discharge, in order to keep the state of the most appropriate electrical discharge at all times, it is necessary to keep the most appropriate gap between the wire electrode and the workpiece. In order to keep the most appropriate gap, it can be considered to directly measure the gap so that it can be used for controlling the feed of the drive shaft to feed the workpiece. However, since the profile of the workpiece is changed in the working process and further chips are created between the wire electrode and the workpiece in the process of electrical discharge, it is difficult to directly measure the gap. On the other hand, it is well known that a linear relation is established between the gap formed by the wire electrode and the workpiece and the average working voltage obtained when the working voltage is averaged. Accordingly, keeping the average working voltage constant is equivalent to keeping the gap constant. Therefore, it is necessary to keep the average working voltage constant by adjusting positions of the wire electrode and the workpiece and also by adjusting the working speed.

As described above, it is very important to use work monitoring information expressing the tendency of the working voltage and working speed. Therefore, an operator carefully watches the work monitoring information so that it can be used for judging whether or not working is being conducted in a good state. In order to accomplish a high reproducing property of the workpiece, it is also necessary to record the measured data of dimensional accuracy of the workpiece, the work monitoring information, the environmental information such as atmospheric temperature and work fluid temperature, and various working conditions such as working speed and working time.

In the conventional wire electrical discharge machine, as shown in FIG. 5, the operator writes down on a notebook the work voltage shown on the image plane of the display of the numerically controlling device, the working speed, the environmental information such as environmental temperature, the work condition used in the present work, the time data such as time required for the work, and the measured data of the workpiece, so that the operator can ensure the reproducing property. In the case where a new working is conducted and the electrical condition is unknown, the work condition to be tested and the measured data of the work piece are recorded on a notebook, and the operator repeats the work to find the most appropriate work condition to be adopted in the new working.

Concerning the conventional numerically controlling device for an electrical discharge machine, Japanese Unexamined Patent Publication No. 7-204942 discloses a technique by which a change in the working state is displayed on the image plane of the display. When various types of working are conducted by the above prior art, in order to enhance the reproducing property of working, it is necessary for the operator to write down records such as measured data of the workpiece and changes in the working state. As the electrical discharge machine having a numerically controlling device, Japanese Unexamined Patent Publication No. 62-212808 discloses a technique by which information shown on the image plane of the display is printed on a sheet of paper. However, there is provided no information relating to the measured data of the workpiece and other image plane information. Accordingly, it is impossible to lighten the burden imposed on the operator when he manages the result of work.

SUMMARY OF THE INVENTION

The present invention has been accomplished to solve the above problems. It is an object of the present invention to provide a numerically controlling device for an electrical discharge machine characterized in that: the work condition, mechanical information, monitoring information in the process of working and accuracy data of a workpiece are entirely displayed on a list for each session of work and recorded as a data base and further outputted onto a sheet of paper if necessary.

In the numerically controlling device for an electrical discharge machine of the present invention, the setting information such as a working condition and working program, the work monitoring information in the process of working conducted by the electrical discharge machine, and the measured date of the workpiece which has been worked are displayed on a list for each session of work.

In the numerically controlling device for an electrical discharge machine of the present invention, the numerically controlling device is connected to a computer, and the work condition which is set in the numerically controlling device, the setting information such as a work program, the work monitoring information in the process of working of the electrical discharge machine, and the measured data of the workpiece which has been worked are displayed on a list by the computer for each session of work.

Further, in the numerically controlling device for an electrical discharge machine of the present invention, a display on a list for each session of work is one record of a data base.

In the numerically controlling device for an electrical discharge machine of the present invention, the above display on the list for each session of work is made to be a form capable of being printed on a sheet of paper or a form capable of being browsed with a WWW browser.

In the numerically controlling device for an electrical discharge machine of the present invention, one record of the data base is made to be a form capable of being printed on a sheet of paper or a form capable of being browsed with a WWW browser.

BRIEF DESCRIPTION OF DRAWINGS

FIG. 2 is a view showing an arrangement of a data base of Embodiment 1 of the present invention.

FIG. 3 is a view showing an example of a list of work information of Embodiment 1 of the present invention.

FIG. 4 is a view showing an arrangement of a numerically controlling device for an electrical discharge machine of Embodiment 2 of the present invention.

FIG. 5 is a view showing information displayed on an image plane of a display device of a conventional numerically controlling device.

DETAILED DESCRIPTION OF THE PRESENT INVENTION

Embodiment 1

Figure 1:
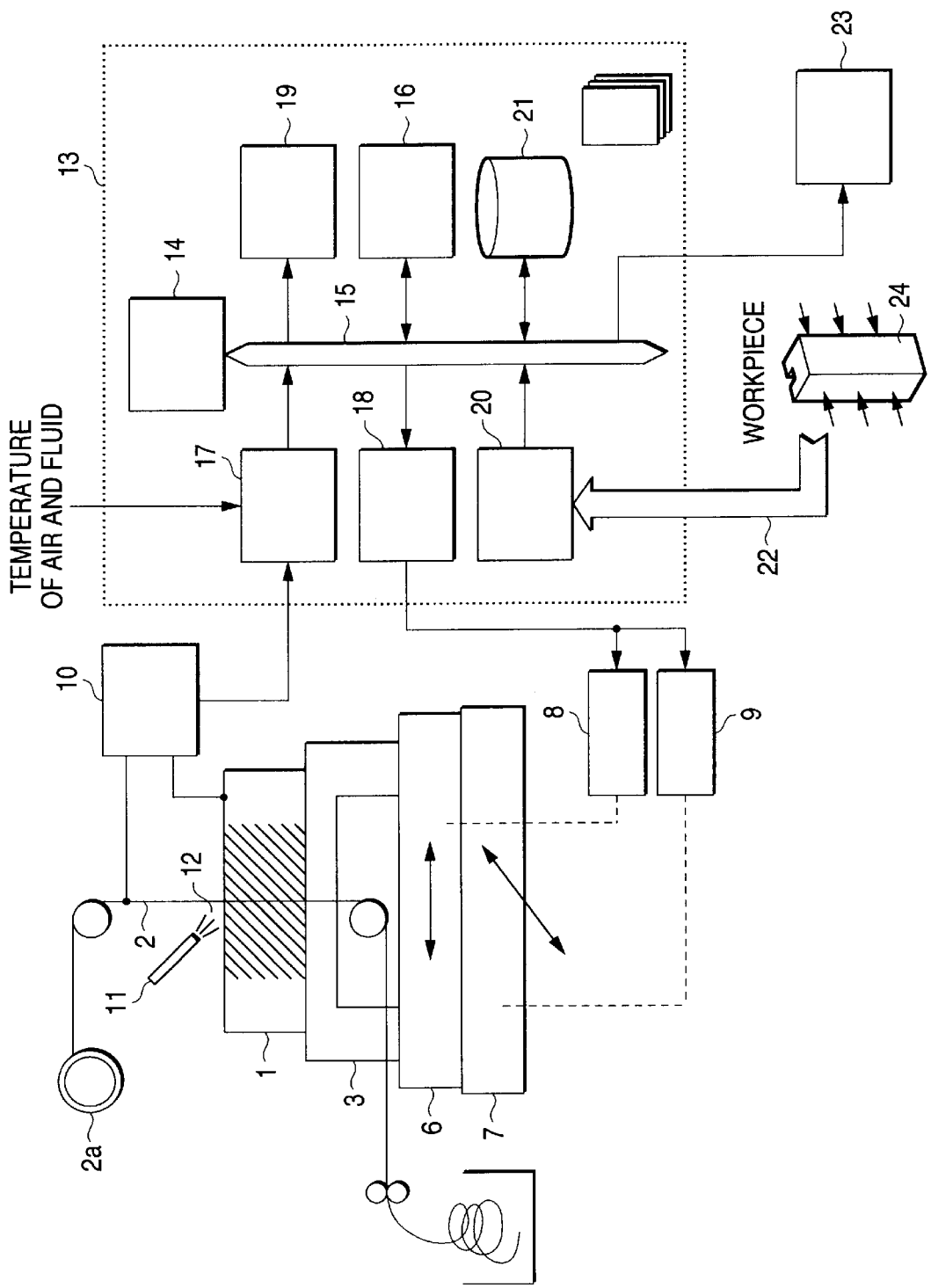
FIG. 1 is a view showing an arrangement of a numerically controlling device for an electrical discharge machine of Embodiment 1 of the present invention.

FIG. 1 is a view showing an arrangement of a wire electrical discharge machine into which a numerically controlling device of an embodiment of the present invention is incorporated. In the drawing, reference numeral 1 is a workpiece, reference numeral 2 is a wire electrode, reference numeral 3 is a surface plate onto which the workpiece 1 is fixed, reference numeral 6 is an X-table used for driving the workpiece 1 in the horizontal direction (X-direction), reference numeral 7 is a Y-table used for driving the workpiece 1 in the horizontal direction (Y-direction), reference numeral 8 is an X-axis servo amplifier for controlling a drive motor not shown which drives X-table 6, reference numeral 9 is a Y-axis servo amplifier for controlling a drive motor not shown which drives Y-table 7, reference numeral 12 is a work fluid, reference numeral 11 is a nozzle for injecting the work fluid 12, reference numeral 13 is a numerically controlling device, reference numeral 14 is a CPU of the numerically controlling device 13, reference numeral 15 is a bus to connect CPU 14 with various devices, reference numeral 16 is a memory for storing a work condition and work program, reference numeral 17 is a work information reading device into which a change in the voltage in the process of work and a change in temperature are inputted, reference numeral 18 is a locus movement controlling means for controlling a movement of the electrode in the process of work conducted by the wire electrode 2 according to an axis movement command calculated by CPU on the basis of a work profile of the work program, reference numeral 19 is a display for displaying a work profile and work monitoring information, reference numeral 20 is an input device such as a keyboard, reference numeral 21 is a memory device for storing a work condition, work profile and work monitoring information in the form of a data base, reference numeral 22 is measurement data such as dimensional accuracy of a workpiece, reference numeral 23 is a document output device to print information of the numerically controlling device 13 on a sheet of paper, and reference numeral 24 is a workpiece which has already been worked.

In this connection, the wire electrode 2 supplied from the wire bobbin 2a is arranged at the workpiece 1 leaving a predetermined interval, and the work fluid 12 is supplied from the work fluid nozzle 11 to the workpiece 1. The work power source 10 is connected between the workpiece 1 and the wire electrode 2 and composes a discharge circuit. In the numerically controlling device 13, CPU 14 is connected with the memory 16, display device 19, input device 20 and memory device 21 via the bus 15. On the display device 19, it is possible to conduct monitoring a change in the state of the wire discharge machine irrespective of whether the wire discharge machine is operating or not.

Next, operation of the wire discharge machine will be explained below. After the workpiece 1 has been set on the surface plate 3 and the setting of the workpiece 1 has been completed, the wire electrode 2 is set and the wire discharge work is started. CPU 14 provided in the numerically controlling device 13 calculates a movement locus of the wire electrode 2 by the work profile stored in the work program in the memory 16 and controls a locus movement of the wire electrode 2 by controlling the movement of the wire electrode 2 in the traverse direction, that is, by controlling the drive of both X-table 6 and Y-table 7. The electrical condition stored in the memory 16 is called up by CPU 14 according to the work step such as the step of rough work or finish work, and the work condition corresponding to each step is set in the work power source 10 and electrical discharge work is conducted. When the final work program is completed, wire discharge work is completed and the final product 24 can be obtained.

In this case, operation conducted by the numerically controlling device 13 during the process of working the product 24 will be explained as follows. On the display device 19 of the numerically controlling device 13 that is in operation, pieces of information such as pieces of information of work programs, work profiles and work conditions, which are necessary for the operator to grasp the state of the work machine, are displayed in the same manner as that of the image plane of the display device of the well known numerically controlling device shown in FIG. 5. Pieces of work monitoring information such as a change in the work voltage and a change in the work speed, which are necessary for the operator to grasp the work state of the workpiece 24, are inputted into CPU 14 from the work information reading device 17 via the bus 15 and processed by CPU 14 and then displayed on the display device 19 via the bus 15. At this time, the state of the work machine and work monitoring information, which can be confirmed on the display device 19 by the operator, are recorded in the data base formed in the memory device 21. External data such as temperatures of air and fluid are also inputted into the work information reading device 17 and outputted onto the display device 19 via the bus 15 and recorded in the data base in the memory device 21 at the same time. Measured data of the product 24 is recorded in the data base of the memory device 21 in such a manner that the operator measures the dimensional accuracy and others after the completion of working the product 24 and then inputs the measured data by the input device 20 such as a keyboard.

As described above, pieces of information such as information processed by CPU 14, information stored in the memory 16 and information inputted by the input device such as a keyboard are recorded in the data base in the memory device 21.

Next, referring to the example shown in FIG. 2, the structure of the record (form) of the data base in the memory device 21 will be explained below. As shown in the drawing, pieces of information recorded in the data base in the memory device 21 are inside information of the numerically controlling device 13 (arrangement information, work monitoring information and result of work), measured data of the product 24 and comment of the operator. Concerning the structure of the data base, as shown in FIG. 2, one work content is composed of one record as shown in FIG. 2. Concerning the items of the field in the record, for example, the following items are provided.

Items for setting the arrangement
        Wire electrode (type, diameter), workpiece (type, wall thickness)
        Item of taper, machine number)
        Work fluid (flow rate, fluid pressure, temperature), setting of nozzle clearance
        Date, time, air temperature, work program information
    Work condition information
        Frequency of work (1st, 2nd, 3rd . . . , spread sheet display)
        Electrical condition No, notch setting information, quantity of offset, quantity of draw)
        Setting of average voltage, setting of work speed
    Result of work (data inside numerically controlling device)
        Work time (1st, 2nd, 3rd, . . . , total work time)
        Work speed (1st, 2nd, 3rd, . . . , average work speed)
    Result of work (portion into which measured data is inputted)
        measured data of surface roughness, accuracy of straightness and accuracy of dimensions)
    Work monitoring information
        Profile of work program
        Work speed (1st, 2nd, 3rd, . . . )
        Work voltage (1st, 2nd, 3rd, . . . )
    Comment inputting section
        Point of work, judgment of quality, matter that demands special attention
        Work diary, name of operator Each field item described above is only one example. Therefore, it is possible to provide a field item except for the above.

Concerning the types of data of the fields of the data base of the memory device 21, there are provided text data, numerical data and image data. For example, concerning the work monitoring information and work result, it is not limited to the numerical data such as a work speed and work time, but it is possible to record the work program profile, which is displayed on the display device 19, by the form of image data. Concerning the form of the data base, HTML form, SGML form and PDF form, which are well known formats in the field of the internet, may be used. When the above forms of the data base are used, the work information can be effectively reused. When the work information and work result are recorded in the form of data base, the work information and work result can be easily searched.

Next, the form of display of the data base of the memory device 21 will be explained below. Pieces of information such as a work condition, work monitoring in formation and work result, which are recorded in the form of the data base of the memory device 21, are displayed on the display device 19 via t he bus 15, so that they can be confirmed by the operator. FIG. 3 is a view showing an example of the form by which the work information recorded at one record for each session of work content in the data base of the memory device 21 are displayed on a list. As shown in FIG. 3, the work information inside the numerically controlling device 13, the measured data of the product 24 and the comment of the operator, which are recorded in the data base of the memory device 21, can be confirmed on the list.

Further, pieces of work information such as a work condition, work monitoring information and work result, which are recorded in the form of the data base of the memory device 21 to be displayed by the display device 19 on a list, can be outputted into the document output device 23 via the bus 15 and printed on a sheet of paper. When the work information for each session of work content is printed on a sheet of paper in the same form as that of the list outputted onto the display device 19, for example, sheets of paper of the work information for each session of work content can be filed.

Embodiment 2

FIG. 4 is a view showing an arrangement of a wire electrical discharge machine into which a numerically controlling device of another embodiment of the present invention is incorporated. In the drawing, reference numeral 30 is a computer composed of a main body and a display device, reference numeral 25 is a communication device for transmitting work information of the numerically controlling device 13 to the computer, and reference numeral 31 is a memory device of the computer for recording a work condition, work profile and work monitoring information, which are stored in the computer, in the form of a data base. In this case, the numerically controlling device 13 and the computer 30 are connected with each other by the well known communicating method such as a cable connection of one-on-one, network connection or remote connection via a modem. In this case, other reference numerals of Embodiment 2 are the same as those of Embodiment 1.

Although the structure of the numerically controlling device 13 is not shown in FIG. 4, the numerically controlling device 13 is composed of CPU, memory, display device and so forth in the same manner as Embodiment 1. It is possible to monitor a change in the state of the wire discharge machine irrespective of whether or not working is being conducted. Operation of the wire discharge machine shown in FIG. 4 is the same as that of Embodiment 1.

In this case, operation of the numerically controlling device 13 which is working the workpiece 24 and also operation of the computer 30 connected with the numerically controlling device 13 will be explained below. In the same manner as Embodiment 1, on the display device of the numerically controlling device 13, which is being operated, there are displayed pieces of information such as work program information, work profile and work condition which are necessary for the operator to grasp a state of the wire discharge machine. Also, in the same manner as Embodiment 1, on the display device of the numerically controlling device 13, which is being operated, there are displayed pieces of work monitoring information such as a change in the work voltage and a change in the work speed which are necessary for the operator to grasp a state of work of the workpiece 24.

At this time, a piece of work information stored in the numerically controlling device 13 is transmitted to the computer 30 via the communication device 25 connected with the numerically controlling device 13 and recorded in the data base of the memory device 31 of the computer. The measured data 22 of the product 24 is inputted from the keyboard of the computer 30 after the operator has measured the dimensional accuracy after the completion of work of the product 24 and then recorded in the data base of the memory device 31 of the computer. Alternatively, in the same manner as Embodiment 1, after the completion of work of the product 24, the operator measures the dimensional accuracy, and the measured data 22 of the product 24 may be inputted from the input device 20 of the numerically controlling device 13 and recorded in the data base of the memory device 31 of the computer via the communication device 25.

In this connection, the composition of the data base in the memory device 31 of the computer and form of the list of work information are the same as those of Embodiment 1.

In Embodiment 2, the numerically controlling device 13 and the computer 30 are connected with each other by one-on-one, however, the present invention is not limited to the above specific embodiment, that is, a plurality of numerically controlling devices and the computer may be connected with each other.

In the above embodiments, a wire electrical discharge machine is taken as an example of the electrical discharge machine. However, a diesinking electrical discharge machine, a laser beam machine or others may be taken as an example of the electrical discharge machine.

According to the invention described above, the setting information such as a work condition and work program which are set in the numerically controlling device, the work monitoring information in the process of working conducted by an electrical discharge machine and the measured data of a product machined by the electrical discharge machine are displayed on a list for each session of work. Therefore, the state of working can be effectively confirmed by the operator, and also the judgment of quality can be effectively made by the operator. Further, since the work information can be immediately confirmed, it is possible to effectively find the cause of a problem such as a dimensional inaccuracy of a product.

The numerically controlling device is connected to a computer, and the work condition which is set in the numerically controlling device, the setting information such as a work program, the work monitoring information in the process of working of the electrical discharge machine and the measured data of the product which has been worked by the electrical discharge machine are displayed on a list by the computer for each session of work. Therefore, even when the operator is at a distant position from the electrical discharge machine, it is possible for him to judge the quality of a product and find the cause of a problem such as inaccuracy of a product.

Further, the display on a list for each session of work is one record of the data base. Therefore, the work information can be easily managed, and the work information and the work result for each session of work can be easily searched.

The above display on the list for each session of work is made to be a form capable of being printed on a sheet of paper or a form capable of being browsed with a WWW browser, or one record of the data base is made to be a form capable of being printed on a sheet of paper or a form capable of being browsed with a WWW browser. Therefore, the operator can easily make a work report, so that the working efficiency can be greatly improved.

As described above, the numerically controlling device for an electrical discharge machine of the present invention is suitably used for confirming a state of working a workpiece, judging whether or not the work condition is appropriate and finding the cause of a problem such as a dimensional inaccuracy of a product.

What is claimed is:

1. A numerically controlling device for an electrical discharge machine wherein setting information of the numerically controlling device, work monitoring information in the process of working conducted by the electrical discharge machine and measured data of a workpiece worked by the electrical discharge machine are displayed on a list by a display device of the numerically controlling device for each session of work.

2. The numerically controlling device for an electrical discharge machine according to claim 1, wherein a display on a list for each session of work described above is one record of a data base.

3. The numerically controlling device for an electrical discharge machine according to claim 1, wherein the display on the list for each session of work described above is made to be a form capable of being printed on a sheet of paper or a form capable of being browsed with a WWW browser.

4. The numerically controlling device for an electrical discharge machine according to claim 2, wherein one record of the data base is made to be a form capable of being printed on a sheet of paper or a form capable of being browsed with a WWW browser.

5. A numerically controlling device for an electrical discharge machine wherein the numerically controlling device is connected with a computer; and setting information of the numerically controlling device, work monitoring information in the process of working conducted by the electrical discharge machine and measured data of a workpiece worked by the electrical discharge machine are displayed on a list by a display device of the computer for each session of work.

6. The numerically controlling device for an electrical discharge machine according to claim 5, wherein a display on a list for each session of work described above is one record of a data base.

7. The numerically controlling device for an electrical discharge machine according to claim 5, wherein the display on the list for each session of work described above is made to be a form capable of being printed on a sheet of paper or a form capable of being browsed with a WWW browser.

8. The numerically controlling device for an electrical discharge machine according to claim 6, wherein one record of the data base is made to be a form capable of being printed on a sheet of paper or a form capable of being browsed with a WWW browser.

* * * * *